United States Patent
Sampigethaya et al.

(10) Patent No.: US 8,769,608 B2
(45) Date of Patent: Jul. 1, 2014

(54) AIRPORT SECURITY SYSTEM

(75) Inventors: Radhakrishna G. Sampigethaya, Bellevue, WA (US); Mingyan Li, Redmond, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 13/028,456

(22) Filed: Feb. 16, 2011

(65) Prior Publication Data

US 2012/0210387 A1 Aug. 16, 2012

(51) Int. Cl.
*H04L 29/06* (2006.01)
*G08G 5/00* (2006.01)
*G06F 11/00* (2006.01)

(52) U.S. Cl.
CPC ........... *H04L 63/1416* (2013.01); *H04L 63/105* (2013.01); *H04L 63/0227* (2013.01); *G08G 5/0013* (2013.01); *G08G 5/0095* (2013.01)
USPC .............................................. 726/1; 726/22

(58) Field of Classification Search
CPC .............. H04L 63/105; H04L 63/1416; H04L 63/0227; G08G 5/0013; G08G 5/0095; G06Q 10/0635
USPC ....................................................... 726/1, 22
See application file for complete search history.

(56) References Cited

U.S. PATENT DOCUMENTS

| | | | |
|---|---|---|---|
| 7,779,458 B1* | 8/2010 | Heiderscheit et al. | 726/11 |
| 2002/0138726 A1* | 9/2002 | Sames et al. | 713/166 |
| 2006/0010438 A1* | 1/2006 | Brady et al. | 717/174 |
| 2006/0059557 A1* | 3/2006 | Markham et al. | 726/22 |
| 2006/0080541 A1* | 4/2006 | Monaco et al. | 713/182 |
| 2006/0271563 A1* | 11/2006 | Angelo et al. | 707/100 |
| 2007/0094741 A1* | 4/2007 | Lynn et al. | 726/26 |
| 2008/0012703 A1* | 1/2008 | Falavigna et al. | 340/540 |
| 2009/0072024 A1 | 3/2009 | Bonneau, Jr. et al. | |
| 2009/0133112 A1* | 5/2009 | Kauffman et al. | 726/11 |
| 2009/0198390 A1* | 8/2009 | Bovet et al. | 701/2 |
| 2009/0282469 A1* | 11/2009 | Lynch et al. | 726/11 |
| 2009/0303083 A1* | 12/2009 | Leclercq | 340/945 |
| 2009/0325566 A1* | 12/2009 | Bell et al. | 455/419 |
| 2010/0153156 A1* | 6/2010 | Guinta et al. | 705/8 |
| 2010/0156630 A1* | 6/2010 | Ainsbury | 340/540 |
| 2011/0077754 A1* | 3/2011 | Jones et al. | 700/90 |
| 2012/0084857 A1* | 4/2012 | Hubner et al. | 726/22 |

OTHER PUBLICATIONS

Barry, A. S., K. P. Dickie, and D. S. Mazel. "Perimeter security at San Francisco International Airport: Leveraging independent, existing systems to form an integrated solution." Technologies for Homeland Security, 2009. HST'09. IEEE Conference on. IEEE, 2009.*

(Continued)

*Primary Examiner* — Michael Simitoski
(74) *Attorney, Agent, or Firm* — Yee & Associates, P.C.

(57) ABSTRACT

A method, apparatus, and system for managing network security at an airport. A threat level for the airport is identified. A number of policies for a network data processing system is identified at the airport based on the threat level identified for the airport in response to identifying the threat level for the airport. Enforcement of the number of policies is initiated in the network data processing system.

21 Claims, 6 Drawing Sheets

(56) References Cited

OTHER PUBLICATIONS

Barry, Ann S., and David S. Mazel. "The Secure Perimeter Awareness Network (SPAN) at John F. Kennedy International Airport." Security Technology, 2007 41st Annual IEEE International Carnahan Conference on. IEEE, 2007.*

Ott, Jonathan, Jutta Hild, and Alexander Bauer. "Decision Support to Facilitate Cost-Optimal Response in Time-and Safety-Critical Situation", 2009.*

Weiss, William E. "Dynamic security: an agent-based model for airport defense." Simulation Conference, 2008. WSC 2008. Winter. IEEE, 2008.*

PCT search report dated Apr. 26, 2012 regarding application PCT/US2012/020819, applicant reference 10-0977PCT, filing date Jan. 10, 2012, applicant The Boeing Company, 14 Pages.

Bolczak et al., "Nextgen Flight Security Risk Assessment Information Concept," IEEE/AIAA 28th Digital Avionics Systems Conference, Oct. 2009, pp. 6A.4-1-6A.4-10.

Montanari et al., "A Security Policy Framework for eEnabled Fleets and Airports," 2011 IEEE Aerospace Conference, Mar. 2011, pp. 1-11.

Olive et al. "Commercial Aircraft Information Security—An Overview of Arinc Report 811," 2006 IEEE/AIAA 25th Digital Avionics System Conference, Oct. 2006, pp. 1B3-1-1B3-12.

"Welcome to the Tina project", 1 page, retrieved Dec. 29, 2010 http://intelligentairportorg.uk/.

Kilman et al., "Framework for SCADA Security Policy", pp. 1-6, Sandia National Laboratories report, Albuquerque NM, retrieved Jan. 2011 http://www.sandia.gov/ccss/documents/sand_2005_1002C.pdf.

"Why Proximetry?", AIRSync Network and Performance Management for Wireless Networks, pp. 1-2 retrieved Dec. 20, 2010, http://proximetry.com/.

Homeland Security Advisory System , 1 page, retrieved Dec. 29, 2010 http://www.dhs.gov/files/programs/Copy_of_press_release_0046.shtm.

Sampigethaya et al., "Security of Future eEnabled Aircraft Ad hoc Networks", pp. 1-10, American Institute of Aeronautics and Astronautics, retrieved Jan. 2011 http://www.ee.washington.edu/research/nsl/papers/atio-08.pdf.

* cited by examiner

| SAFETY EVENT | SECURITY EVENT | BUSINESS EVENT | OPERATIONAL EVENT | THREAT LEVELS |
|---|---|---|---|---|
| 3 | 4 | NA | NA | RED |
| 2 | 3 | NA | NA | ORANGE |
| 1 | 2 | 3 | 3 | YELLOW |
| 0 | 1 | 2 | 2 | BLUE |
| 0 | 0 | 1 | 1 | GREEN |

AIRPORT SECURITY SYSTEM

BACKGROUND INFORMATION

1. Field

The present disclosure relates generally to security and, in particular, to security at airports. Still more particularly, the present disclosure relates to a method and apparatus for managing cyber security at network-enabled airports.

2. Background

Airports are locations at which travelers board and exit aircraft. Airport security involves techniques and methods used to protect airports and aircraft from undesired actions that may disrupt or reduce the safety of travelers at airports. Airport security has been focused on preventing persons from bringing undesired materials into an airport or onto an aircraft. Currently, airport security has been focused on physical materials.

As new technologies are introduced into aircraft and airports, maintaining a desired level of security becomes more challenging. For example, with e-enabled aircraft, airports may be built or upgraded to include networks to facilitate communication with these types of aircraft. These networks allow the airport, airline, and other entities to exchange information with an aircraft at the airport.

These types of communications allow for improvements in scheduling, aircraft maintenance, operational efficiencies, passenger amenities, and other features.

The use of networks and communications with aircraft involve cyber security concerns for airports and airport users. For example, the ease of accessibility to wireless communications may allow for unauthorized remote access to the networks. Wireless communications may provide a way for undesired persons to manipulate, copy, delete, or otherwise access data in an undesired manner in aircraft and on different systems at an airport.

Therefore, it would be advantageous to have a method and apparatus that takes into account at least some of the issues discussed above, as well as other possible issues.

SUMMARY

In one advantageous embodiment, an apparatus comprises a network data processing system, a policy manager, and a number of agents. The network data processing system is configured for use at an airport. The policy manager is configured to manage a number of policies based on a threat level for the airport. The number of agents is configured to run on the network data processing system and to implement the number of policies on the network data processing system.

In another advantageous embodiment, an aircraft communications system comprises a network data processing system at an airport, a policy manager, and a number of agents. The policy manager is configured to manage a number of policies for communicating with a number of data processing systems on an aircraft at the airport. The number of agents is configured to run on the network data processing system and to implement the number of policies for communicating with the number of data processing systems.

In yet another advantageous embodiment, a method is present for managing network security at an airport. A number of policies for a network data processing system is identified at the airport based on the threat level identified for the airport in response to identifying the threat level for the airport. Enforcement of the number of policies is initiated in the network data processing system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that current security systems and regulations for airports only take into account physical security issues. For example, the different advantageous embodiments recognize and take into account that the Transportation Security Administration (TSA) and the Federal Aviation Administration (FAA) currently have rules and regulations that apply at airports for the operation of aircraft and for operations performed in and around airports.

The different advantageous embodiments recognize and take into account that current regulations do not anticipate or take into account security issues relating to networks used in an airport environment. Further, the different advantageous embodiments recognize and take into account that currently used security systems for network data processing systems do not take into account issues relating to these types of environments. For example, the different advantageous embodiments recognize and take into account that currently used security systems do not take into account changes in threat levels and how those changes may affect the use of networks at airports.

Thus, the different advantageous embodiments provide an apparatus for managing network security at an airport. In one advantageous embodiment, an apparatus comprises a network data processing system, a policy manager, and a number of agents. The network data processing system is configured for use at the airport. The policy manager is configured to manage a group of policies based on a threat level for the airport. The number of agents is configured to run on the network data processing system and to implement the group of policies on the network data processing system.

Figure 1:
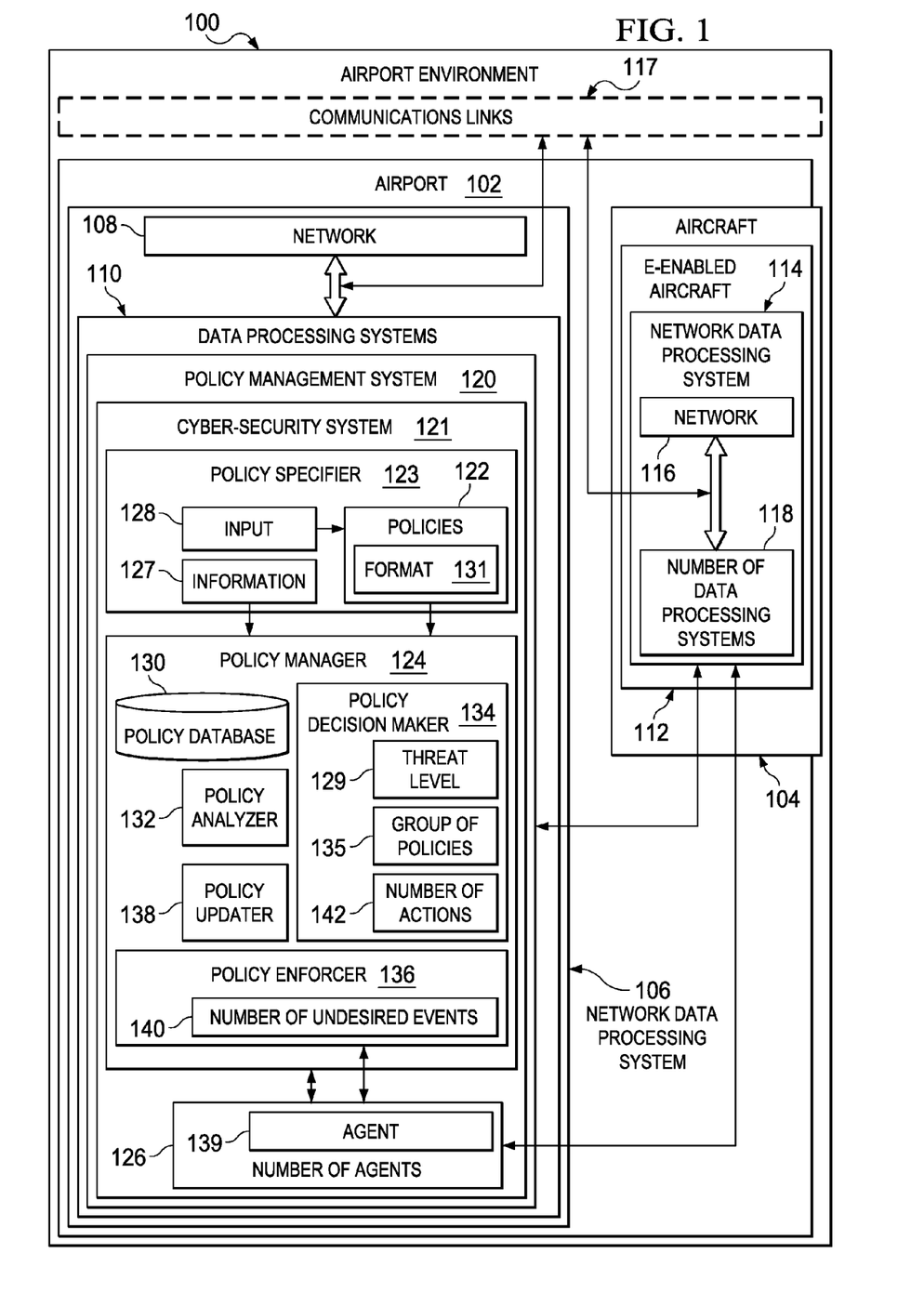
FIG. 1 is an illustration of an airport environment in accordance with an advantageous embodiment.

With reference now to FIG. 1, an illustration of an airport environment is depicted in accordance with an advantageous embodiment. Airport environment 100 is an example of an environment in which different advantageous embodiments may be implemented. In this illustrative example, airport environment 100 includes airport 102. In these examples, aircraft 104 may park, taxi, take off, and land at airport 102 during operation of aircraft 104.

In these illustrative examples, airport environment 100 includes network data processing system 106. Network data processing system 106 comprises network 108 and data processing systems 110. Data processing systems 110 are connected to network 108. Data processing systems 110 are hardware devices that have processor units or other hardware that are configured to process data. Data processing systems 110 include at least one of a computer, a laptop computer, a personal digital assistant, a tablet computer, a mobile phone, and other suitable types of data processing systems.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Additionally, aircraft 104 may take the form of e-enabled aircraft 112. When aircraft 104 takes the form of e-enabled aircraft 112, aircraft 104 is configured to communicate with network data processing system 106 at airport 102 in these illustrative examples. E-enabled aircraft 112 has network data processing system 114. Network data processing system 114 comprises network 116 and number of data processing systems 118. As used herein, "a number of", when used with reference to items, means one or more items. For example, number of data processing systems 118 may be one or more data processing systems.

Number of data processing systems 118 may include at least one of a computer, a line replaceable unit, or some other hardware devices. When more than one computer is present in number of data processing systems 118, these data processing systems are in communication with each other through connections to network 116.

The connections of data processing systems 110 to network 108 and number of data processing systems 118 to network 116 may be made using different types of communications links 117. Communications links 117 include at least one of a wired communications link, an optical communications link, a wireless communications link, a selected access point, and/or other suitable types of communications links.

In the different illustrative examples, policy management system 120 is configured to manage policies 122 at airport 102. Policy management system 120 comprises hardware, software, or a combination of the two. Policy management system 120 may be implemented in one or more data processing systems 110. The management of policies 122 may include at least one of distributing policies 122, creating policies 122, and enforcing policies 122. Policies 122 may be configured to provide security for computers and other types of data processing systems in at least one of airport 102 and aircraft 104.

In these illustrative examples, policy management system 120 may take the form of cyber-security system 121. Cyber-security system 121 provides security for network data processing system 106 at airport 102, as well as network data processing system 114 on e-enabled aircraft 112. Cyber-security system 121 is a system configured to provide security for electronic devices and their communications. These electronic devices for which security is provided may include, for example, without limitation, a computer, a mobile phone, a tablet computer, a router, a wireless interface, a personal digital assistant, a laptop computer, and/or other suitable components for which security and secure communications may be desired.

Policy management system 120 may perform other operations in addition to providing security for network 108 and network 116. For example, policy management system 120 may also manage policies for safety and businesses.

As depicted, policy management system 120 includes policy specifier 123, policy manager 124, and number of agents 126. These different components are located in network data processing system 106 in this illustrative example. Additionally, one or more of number of agents 126 may be located in network data processing system 114 in aircraft 104.

As depicted, policy specifier 123 is located in network data processing system 106. Policy specifier 123 receives input 128. Input 128 may include, for example, without limitation, system goals, requirements, risk assessments, rules, regulations, recommendations, business constraints, and/or other suitable types of information that may be used to generate policies 122. Input 128 may be received or retrieved from any of a number of sources including, without limitation, an airline, a safety organization, a business, a database, and/or other suitable sources.

Policy specifier 123 uses input 128 to generate policies 122. Additionally, in some illustrative examples, policy specifier 123 may identify information 127 for use in identifying threat level 129 for airport 102. Information 127 may include, for example, without limitation, rules, criteria, and/or other suitable information for use in identifying threat level 129 for airport 102. Further, policy specifier 123 may indicate the particular policies in policies 122 to be enforced based on threat level 129 for airport 102.

In these illustrative examples, threat level 129 for airport 102 may be a cyber-security threat level. In other words, threat level 129 may be an indication of the level of risk to the security of network data processing system 106 and/or network data processing system 114.

For example, threat level 129 provides an indication of the risk of theft, corruption, and/or undesired access to network 108, network 116, data processing systems 110 connected to network 108, and/or number of data processing systems 118 connected to network 116. Of course, in other illustrative examples, threat level 129 may also be a physical threat level indicating physical risk to airport 102, aircraft 104, and/or other physical components in airport environment 100. In this manner, threat level 129 may indicate physical and/or cyber-security risk.

Policy specifier 123 generates policies 122 having format 131 for use by policy manager 124. Format 131 may be a language in which policies 122 are written, such as, for example, without limitation, extensible markup language (XML) or some other suitable type of language that can be processed by policy manager 124.

In these illustrative examples, policy manager 124 receives policies 122 generated by policy specifier 123 in format 131. Policy manager 124 may also receive information 127 for identifying threat level 129 from policy specifier 123. Policy manager 124 includes policy database 130, policy analyzer 132, policy decision maker 134, policy enforcer 136, and policy updater 138. Policy manager 124 stores policies 122 in policy database 130.

Policy analyzer 132 analyzes policies 122 to validate policies 122. In particular, policy analyzer 132 verifies that policies 122 are consistent and complete with respect to network data processing system 106 at airport 102 and/or network data processing system 114 in aircraft 104. In these illustrative examples, policy analyzer 132 uses information 127, rules, criteria, models, tables, and/or other suitable information to model network data processing system 106 at airport 102 and/or network data processing system 114 in aircraft 104.

Policy analyzer 132 uses, for example, without limitation, simulation testing techniques, model checking techniques, mathematical modeling methods, and/or other methods to validate policies 122 with respect to the models generated for network data processing system 106 at airport 102 and/or network data processing system 114 in aircraft 104. Validation of policies 122 includes, for example, without limitation, verifying that policies 122 do not violate system constraints and/or rules for network data processing system 106 and/or network data processing system 114. Further, validation of policies 122 also includes verifying that compliance with policies 122 does not make network data processing system 106 and/or network data processing system 114 behave in an undesired manner or cause undesired effects. Further, validation of policies 122 may include verifying policy consistency for all known scenarios of the system.

Policy analyzer 132 identifies any changes that may need to be made to policies 122 to validate policies 122. Any changes that may need to be made to policies 122 identified by policy analyzer 132 may be made to policies 122 by policy updater 138.

Policy decision maker 134 is configured to identify threat level 129 for airport 102. Policy decision maker 134 selects group of policies 135 from policies 122 for enforcement based on threat level 129 identified for airport 102. In particular, policy decision maker 134 selects group of policies 135 for enforcement in network data processing system 106 and/or network data processing system 114 in response to identifying threat level 129 for airport 102. In some illustrative examples, policy decision maker 134 may identify at least a portion of number of agents 126 for enforcing group of policies 135. "At least a portion" of number of agents 126 is one or more of number of agents 126.

In these illustrative examples, policy enforcer 136 initiates enforcement of group of policies 135. For example, policy enforcer 136 may send out group of policies 135 and/or instructions for enforcing group of policies 135 to the portion of number of agents 126 selected by policy decision maker 134. Policy enforcer 136 is configured to send out group of policies 135 and/or instructions in a format that can be processed by number of agents 126. In this manner, policy decision maker 134 and policy enforcer 136 uses number of agents 126 running in network data processing system 106 and/or network data processing system 114 to enforce policies 122.

In these depicted examples, agent 139 is an example of one of number of agents 126. Agent 139 is a software agent configured to run on a computer in these illustrative examples. As one illustrative example, agent 139 is configured to enforce policies 122 on the particular data processing system in network data processing system 106 or network data processing system 114 on which agent 139 is located and runs.

Number of agents 126 provides the network and/or host configurations and other information for their corresponding data processing systems to policy manager 124. Based on the information provided by number of agents 126 and/or other suitable information, policy enforcer 136 determines whether number of undesired events 140 has occurred or is occurring.

Number of undesired events 140 may include any event in which a policy in group of policies 135 that is currently being enforced has not been met in a desired manner. In other words, the event may be a violation of or noncompliance with a policy in group of policies 135 by an agent in number of agents 126 and/or a component in network data processing system 106 and/or network data processing system 114.

In these illustrative examples, policy decision maker 134 determines whether threat level 129 needs to be changed based on number of undesired events 140. In these illustrative examples, policy decision maker 134 identifies number of actions 142 to be performed based on number of undesired events 140 and any changes to threat level 129. Number of actions 142 may include, for example, without limitation, changing a configuration of network 108 and/or network 116, sending out new instructions to one or more of number of agents 126, performing operations within network data processing system 106 and/or network data processing system 114, and/or other suitable actions.

Further, one or more of number of actions 142 may be performed by a human operator. These operations may include, for example, without limitation, maintenance personnel downloading a new database for aircraft 104, airline personnel using higher security systems for communicating with an airline back-office, aircraft mechanisms performing additional visual and manual inspections of onboard electronic devices, and/or other suitable actions.

Policy decision maker 134 and/or policy enforcer 136 may send out instructions and/or information to number of agents 126 for performing number of actions 142. In some illustrative examples, policy decision maker 134 and/or policy enforcer 136 sends out alerts for display to a human operator.

In these depicted examples, policy updater 138 and/or policy analyzer 132 may be configured to update policies 122 based on the information provided by number of agents 126 and number of undesired events 140 identified by policy enforcer 136, changes to threat level 129 identified by policy decision maker 134, and/or changes to information 127. As one illustrative example, policy updater 138 makes changes to policies 122. These changes may include, for example, without limitation, adding a rule to a policy, removing a rule from a policy, changing a rule in a policy, and/or other suitable changes. Policy analyzer 132 analyzes the changes made to policies 122 by policy updater 138 to verify that the changes are correct and complete.

In the different illustrative examples, some decision-making and enforcement capabilities may be assigned to number of agents 126. For example, policy enforcer 136 may send policies 122 to number of agents 126 with an identification of threat level 129. Each of number of agents 126 may then determine which policies within policies 122 to enforce at the data processing system on which the agent is located.

For example, number of agents 126 may be configured to implement policies 122 on at least one of network data processing system 106 and network data processing system 114. As one illustrative example, number of agents 126 may be configured to manage communications with a data processing system in number of data processing systems 118 on aircraft 104.

For example, number of agents 126 may be configured to specify at least one of a type of communications link in communications links 117, a particular data processing system in network data processing system 106 used to communicate with the data processing system on aircraft 104, a wireless access point, and a time during which the communications between the particular data processing system in network data processing system 106 and the data processing system on aircraft 104 is permitted.

In this manner, policy management system 120 manages policies 122 at airport 102 based on threat level 129. Further, policy management system 120 provides a system for managing security at airport 102. Additionally, policy management system 120 provides a system for sending information to data processing systems 110 and/or number of data processing systems 118 to manage security of these data processing systems and update policies 122 being enforced at these data processing systems.

The illustration of airport environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments For example, in some advantageous embodiments, other airports, in addition to airport 102, may be present in airport environment 100. Also, some components may be located in another location other than network data processing system 106. For example, policy specifier 123 may be located in a back end office or at some other location other than in network data processing system 106 at airport 102.

Figure 2:
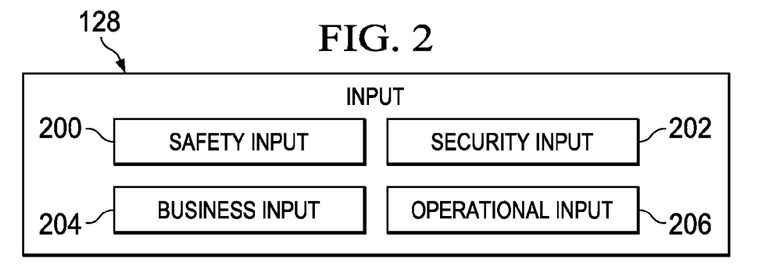
FIG. 2 is an illustration of input used to generate policies in accordance with an advantageous embodiment.

With reference now to FIG. 2, an illustration of input used to generate policies is depicted in accordance with an advantageous embodiment. As depicted in this example, input 128 used to generate policies 122 in FIG. 1 may include different types of input. For example, input 128 may include, without limitation, safety input 200, security input 202, business input 204, and/or operational input 206.

In this depicted example, safety input 200 includes safety regulations and rules defined by, for example, the Federal Aviation Administration (FAA), Air Traffic Management (ATM), and/or other organizations. For example, safety input 200 may include rules and regulations for regulating access to and operation of components within airport environment 100 in FIG. 1. Further, safety input 200 may include rules and/or other suitable information about the safety of physical and/or mobile resources and information assets in airport 102 and/or aircraft 104 in FIG. 1.

In this illustrative example, security input 202 includes rules, requirements, and/or other suitable information about the cyber security and physical security of, for example, airport 102 and aircraft 104 in FIG. 1. Further, security input 202 includes recommendations for operating and configuring network data processing system 114 and/or network data processing system 106 in FIG. 1.

Security input 202 may be based on security information about airport 102 in FIG. 1, aircraft 104 in FIG. 1, the airline, and/or the passengers. Further, security input 202 may be provided by entities, such as the airline, the Federal Aviation Administration (FAA), Air Traffic Management (ATM), and/or other organizations.

Further, business input 204 includes requirements, rules, and business constraints, as set by business stakeholders. Business stakeholders include the multiple business entities or persons involved in owning, managing, and operating an airport and the aircraft that fly in and out of the airport.

In this manner, business input 204 includes information about the methods and/or systems for safely and securely addressing the business goals of the multiple stakeholders associated with airport environment 100 in FIG. 1. For example, business input 204 takes into account the business needs and/or goals of airport 102, aircraft 104, the airline, the passengers, and/or other business entities associated with airport environment 100.

In this depicted example, operational input 206 includes airport operational policies for performing airport operations. Airport operations may include, for example, without limitation, changing departure and/or arrival routes, changing the use of existing runways and/or terminals, changing emergency response policies, and/or other suitable types of operations.

In some illustrative examples, operational input 206 may also include aircraft operational policies for performing aircraft operations and/or information about the safety systems onboard an aircraft. Aircraft operations may include, for example, without limitation, selecting an emergency response policy for use, procedures for the different phases of flight for an aircraft, and/or other suitable types of operations. Operational input 206 takes into account airport 102 in FIG. 1, aircraft 104 in FIG. 1, the airline, and Air Traffic Management (ATM).

Safety input 200, security input 202, business input 204, and operational input 206 are used by policy specifier 123 to generate policies 122 in FIG. 1. Policy specifier 123 uses these types of input to generate policies 122 that are enforced to safely manage airport environment 100.

The illustration of input 128 in FIG. 2 is not meant to imply physical or architectural limitations to the manner in which the different advantageous embodiments may be implemented. For example, input 128 may include other types of input in addition to or in place of the types of input depicted in FIG. 2.

Figure 3:
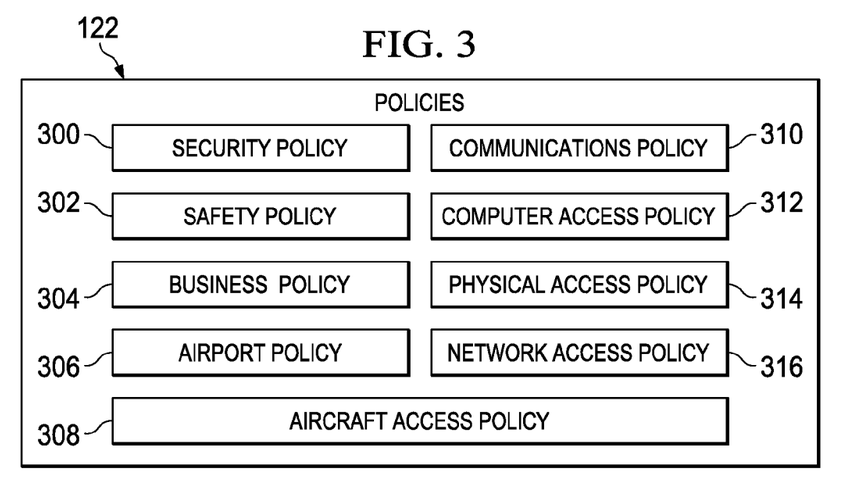
FIG. 3 is an illustration of different types of policies in accordance with an advantageous embodiment.

With reference now to FIG. 3, an illustration of different types of policies is depicted in accordance with an advantageous embodiment. In this illustrative example, policies 122 from FIG. 1 may include at least one of security policy 300, safety policy 302, business policy 304, airport policy 306, aircraft access policy 308, communications policy 310, computer access policy 312, physical access policy 314, and network access policy 316.

In this illustrative example, security policy 300 is a policy that may be generated based on, for example, security input 202 in FIG. 2. Safety policy 302 is a policy that may be generated based on, for example, safety input 200 in FIG. 2. Business policy 304 is a policy that may be generated based on, for example, business input 204 in FIG. 2. Additionally, airport policy 306 is a policy that may be generated based on, for example, operational input 206 in FIG. 2.

In this depicted example, aircraft access policy 308 may be generated based on rules and/or regulations for allowing access to network data processing system 114 in aircraft 104 in FIG. 1. For example, aircraft access policy 308 may identify rules for which users and/or programs are allowed to access number of data processing systems 118 through network 116 in network data processing system 114 or remotely.

Communications policy 310 may be generated based on the different rules, regulations, and/or parameters for using different types of communications. Communications policy 310 identifies the type of communications to be used within network data processing system 114 in aircraft 104. The type of communications may be communications using, for example, a wired communications link, a wireless communications link, an optical communications link, and/or some other suitable type of communications link.

Computer access policy 312 identifies persons who can access a particular data processing system in network data processing system 114 in aircraft 104 and/or a particular data processing system in network data processing system 106 for airport 102 in FIG. 1. Physical access policy 314 identifies instructions for allowing physical access to the different areas in airport 102 in FIG. 1.

In this illustrative example, network access policy 316 identifies the persons who can access network 108 and/or network 116 in airport environment 100 in FIG. 1. Network access policy 316 may indicate, for example, whether only airport personnel or everyone, including passengers, may be allowed to access network 116 in aircraft 104.

Any number of policies 122 may be selected to form group of policies 135 in FIG. 1 for enforcement. The illustration of policies 122 in FIG. 3 is not meant to imply physical or architectural limitations to the manner in which the different advantageous embodiments may be implemented. For example, policies 122 may include other types of policies in addition to or in place of the types of policies depicted in FIG. 3.

Figure 4:
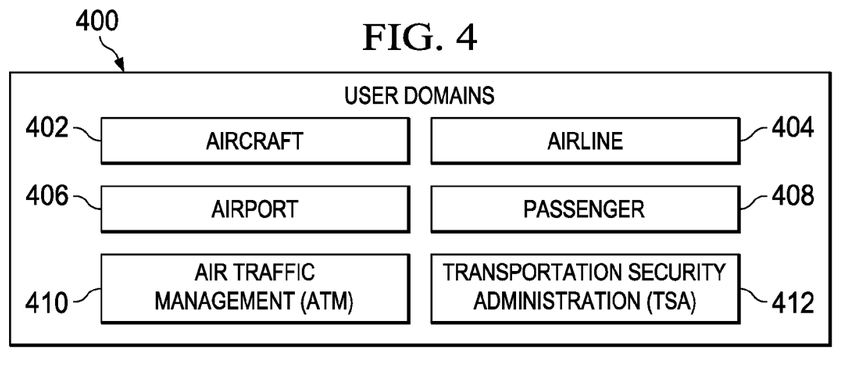
FIG. 4 is an illustration of user domains for an airport environment in accordance with an advantageous embodiment.

With reference now to FIG. 4, an illustration of user domains for an airport environment is depicted in accordance with an advantageous embodiment. In this illustrative example, user domains 400 are user domains for airport environment 100 in FIG. 1. Each user domain in user domains 400 is a domain to which components, devices, and/or persons in airport environment 100 belong.

For example, user domains 400 include aircraft 402, airline 404, airport 406, passenger 408, Air Traffic Management (ATM) 410, and Transportation Security Administration (TSA) 412. As one illustrative example, electronic devices within aircraft 104, network data processing system 114, and the flight crew for aircraft 104 in FIG. 1 belong to the domain, aircraft 402.

A network data processing system, electronic devices, and/or personnel for a particular airline belong to the domain, airline 404. Similarly, network data processing system 106 for airport 102, airport personnel, and/or other components within airport 102 in FIG. 1 belong to the domain, airport 406. In this illustrative example, the passengers either in aircraft 104 and/or in airport 102 may belong to the domain, passenger 408.

In this illustrative example, all electronic devices, personnel, and/or other components associated with Air Traffic Control and Air Traffic Management (ATM) belong to the domain, Air Traffic Management (ATM) 410. Further, all electronic devices, personnel, and/or other components associated with the Transportation Security Administration (TSA) belong to the domain, Transportation Security Administration (TSA) 412. Although specific examples of user domains are illustrated, these examples are not meant to limit different advantageous embodiments to the examples listed. For example, other user domains may include private security companies, ground transportation companies, food and beverage companies, and other suitable users who may provide goods and/or services to airport 102.

Figure 5:
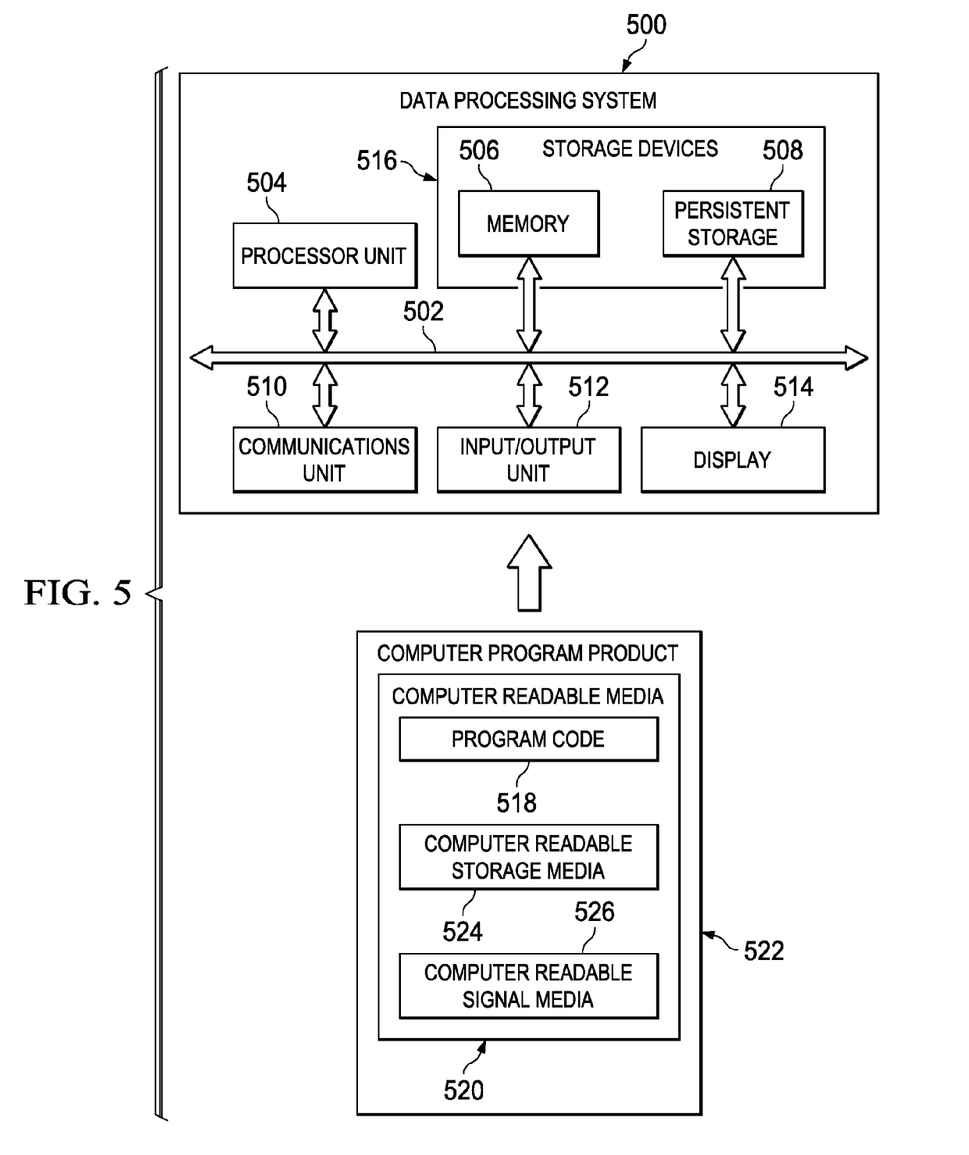
FIG. 5 is an illustration of a data processing system in accordance with an advantageous embodiment.

Turning now to FIG. 5, an illustration of a data processing system is depicted in accordance with an advantageous embodiment. Data processing system 500 is an example of one manner in which data processing systems 110 and number of data processing systems 118 in FIG. 1 may be implemented. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508.

Computer readable storage media 524 also may take the form of a persistent storage, such as a hard drive, a thumb drive, or a flash memory, that is connected to data processing system 500. In some instances, computer readable storage media 524 may not be removable from data processing system 500. In these examples, computer readable storage media 524 is a physical or tangible storage device used to store program code 518, rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to or in place of those illustrated for data processing system 500.

Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 506, or a cache, such as found in an interface and memory controller hub that may be present in communications fabric 502.

Figure 6:
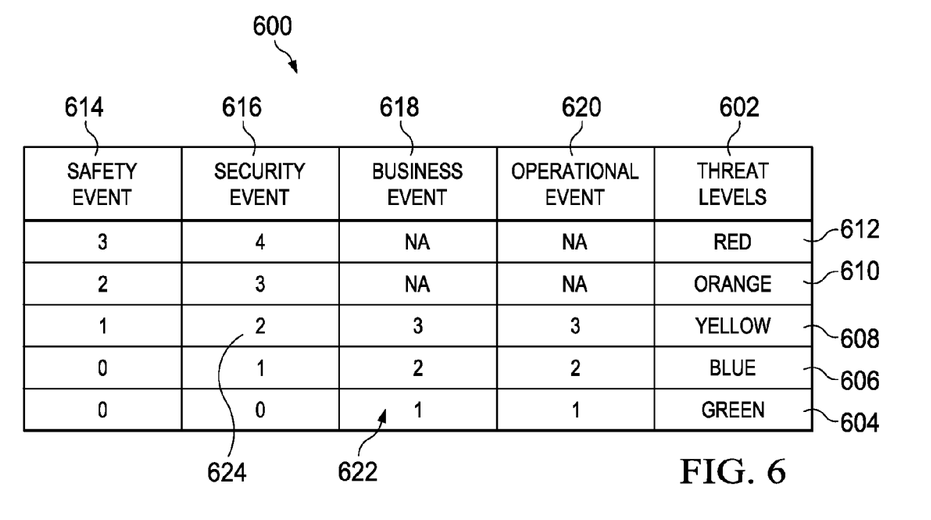
FIG. 6 is an illustration of a table identifying different threat levels in accordance with an advantageous embodiment.

With reference now to FIG. 6, an illustration of a table identifying different threat levels is depicted in accordance with an advantageous embodiment. In this illustrative example, table 600 identifies threat levels 602. Threat level 129 in FIG. 1 may be identified as any one of threat levels 602.

Threat levels 602 include green 604, blue 606, yellow 608, orange 610, and red 612. A threat level for an airport, such as threat level 129 for airport 102 in FIG. 1, may be identified as one of threat levels 602 based on the types of undesired events that are identified.

For example, an undesired event may be identified by policy enforcer 136 in policy manager 124 in FIG. 1 as being one of safety event 614, security event 616, business event 618, and operational event 620. Safety event 614, security event 616, business event 618, and operational event 620 are undesired events, such as violations of and/or noncompliance with policies.

Safety event 614 may be any undesired event that violates or is noncompliant with, for example, safety policy 302 in FIG. 3 based on safety input 200 in FIG. 2. Security event 616 may be any undesired event that violates or is noncompliant with, for example, security policy 300 in FIG. 3 based on security input 202 in FIG. 2.

Similarly, business event 618 is any undesired event that violates or is noncompliant with, for example, business policy 304 in FIG. 3 based on business input 204 in FIG. 2. Further, operational event 620 is any undesired event that violates or is noncompliant with, for example, airport policy 306 in FIG. 3 based on operational input 206 in FIG. 2.

Of course, in other illustrative examples, safety event 614, security event 616, business event 618, and operational event 620 may be violations of or noncompliance with any type of safety rule or requirement, security rule or requirement, business rule or requirement, and operational rule or requirement, respectively.

In this illustrative example, entries 622 indicate the number of user domains in which at least one undesired event has been detected. The user domains may be, for example, user domains 400 in FIG. 4. For example, entry 624 indicates that at least one undesired security event has occurred in two user domains.

As illustrated, a threat level of green 604 is identified when at most one undesired business event occurs in at most one user domain and/or at most one undesired operational event occurs in at most one user domain. For example, a threat level of green 604 may be identified when one undesired business event occurs in one user domain, when no undesired business events occur in any user domain, when one undesired operational event occurs in one user domain, and/or when no undesired operational events occur in any user domain.

A threat level of blue 606 is identified when at least one undesired security event occurs in one user domain, at least one undesired business event occurs in two user domains, and/or at least one undesired operational event occurs in two user domains.

A threat level of yellow 608 is identified when at least one undesired safety event occurs in one user domain, at least one undesired security event occurs in two user domains, at least one undesired business event occurs in three user domains, and/or at least one undesired operational event occurs in three user domains.

A threat level of orange 610 is identified when at least one undesired safety event occurs in two user domains and/or at least one undesired security event occurs in three user domains. A threat level of red 612 is identified when at least one undesired safety event occurs in three user domains and/or at least one undesired security event occurs in four user domains. For red 612 and/or orange 610, undesired business events and/or undesired operational events are not required to be taken into account when undesired safety events and/or undesired security events occur in so many user domains.

Figure 7:
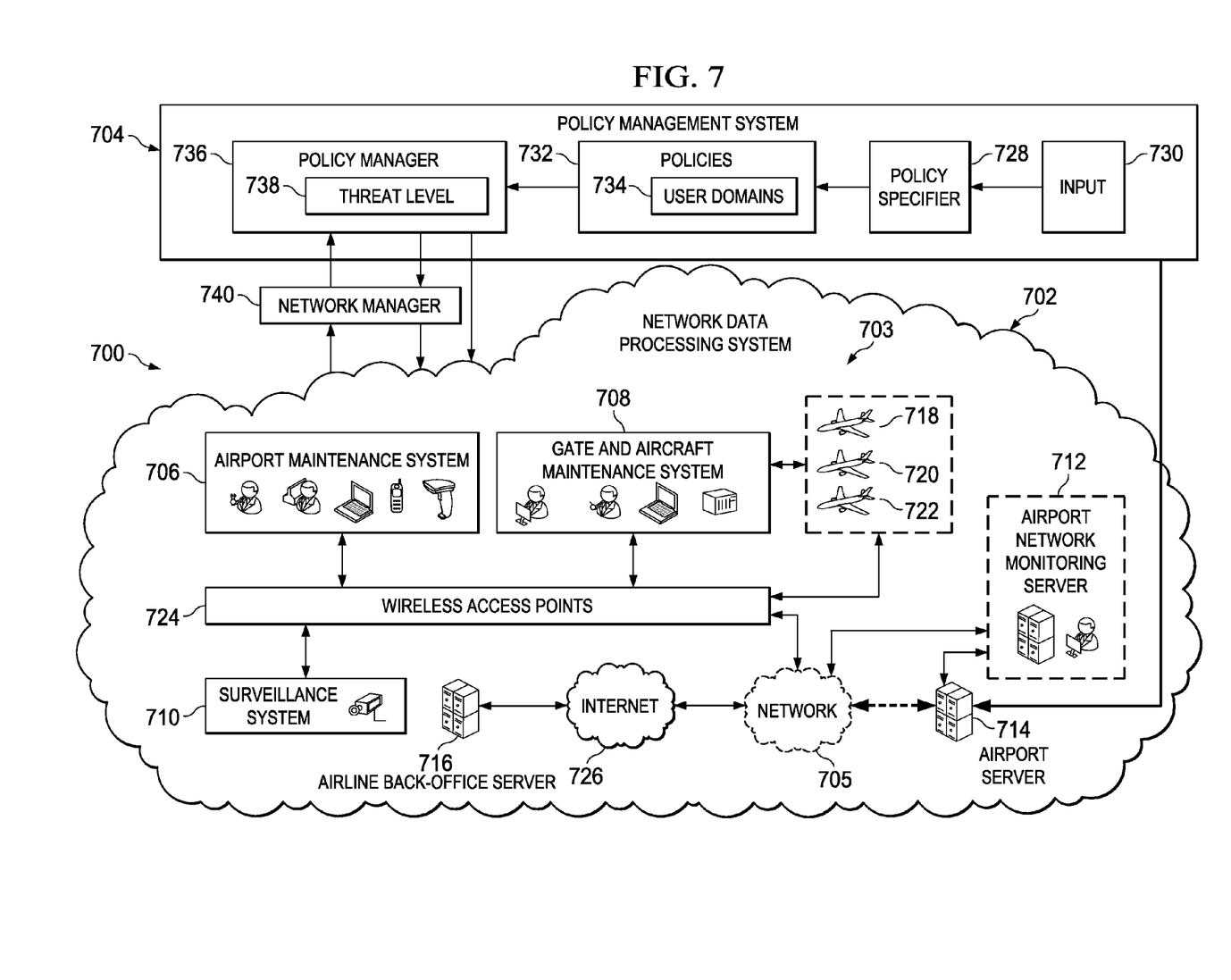
FIG. 7 is an illustration of an airport environment in accordance with an advantageous embodiment.

Turning now to FIG. 7, an illustration of an airport environment is depicted in accordance with an advantageous embodiment. In this illustrative example, airport environment 700 is an example of one implementation for airport environment 100 in FIG. 1. In this illustrative example, airport environment 700 includes network data processing system 702 and policy management system 704.

In this illustrative example, network data processing system 702 includes plurality of data processing systems 703 and network 705. Plurality of data processing systems 703 is connected to network 705 using communications links. These communications links may be, for example, wired communications links, wireless communications links, optical communications links, and/or other suitable types of communications links.

Plurality of data processing systems 703 include airport maintenance system 706, gate and aircraft maintenance system 708, surveillance system 710, airport network monitoring server 712, airport server 714, airline back-office server 716, aircraft data processing system 718, aircraft data processing system 720, and aircraft data processing system 722.

In this illustrative example, airport maintenance system 706, gate and aircraft maintenance system 708, surveillance system 710, aircraft data processing system 718, aircraft data processing system 720, and aircraft data processing system 722 are all located in the same airport. Further, airport maintenance system 706, gate and aircraft maintenance system 708, surveillance system 710, aircraft data processing system 718, aircraft data processing system 720, and aircraft data processing system 722 are connected to network 705 through wireless access points 724. Aircraft data processing system 718, aircraft data processing system 720, and aircraft data processing system 722 are located on aircraft at the airport.

Airport network monitoring server 712, airport server 714, and airline back-office server 716 may be at a location near or remote to the airport and are also configured to connect to network 705. Airline back-office server 716 is connected to network 705 through Internet 726. Airline back-office server 716 provides information, software, and multimedia for the aircraft located in the airport.

In this illustrative example, airport network monitoring server 712 monitors network 705 and provides data on the current configuration of data processing systems connected to network 705. Agents running on plurality of data processing systems 703 may send data to airport network monitoring server 712, which, in turn, sends data to airport server 714. In this manner, airport network monitoring server 712 and airport server 714 are configured to communicate directly with each other.

In this illustrative example, policy management system 704 may be implemented in airport server 714. Of course, in other illustrative examples, policy management system 704 may be implemented in some other data processing system connected to network 705.

As illustrated, policy specifier 728 receives input 730. Policy specifier 728 uses input 730 to generate policies 732. In particular, policies 732 may be generated for user domains 734. Policy specifier 728 sends policies 732 to policy manager 736. Policy manager 736 selects a group of policies from policies 732 to be enforced in network data processing system 702 based on threat level 738.

In this illustrative example, policy manager 736 identifies threat level 738 for use in selecting the group of policies from policies 732. Of course, in other illustrative examples, policy manager 736 may receive an identification of threat level 738 from some other suitable source.

Policy manager 736 enforces the group of policies selected in network data processing system 702 by sending the group of policies and/or instructions for enforcing the group of policies to a number of agents running on plurality of data processing systems 703 through network manager 740.

Policy manager 736 manages security for network data processing system 702 based on the information received by airport network monitoring server 712. In response to undesired events and/or changes to threat level 738, policy manager 736 identifies a number of actions to be performed and/or updates policies 732.

Figure 8:
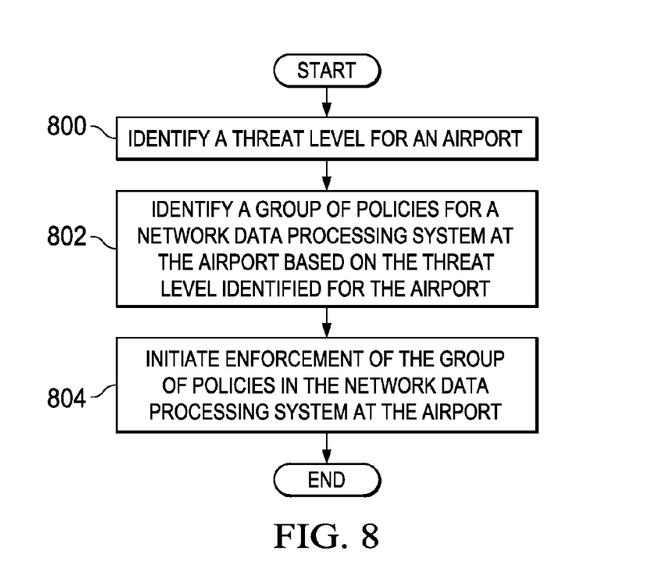
FIG. 8 is an illustration of a flowchart of a process for managing network security at an airport in accordance with an advantageous embodiment.

With reference now to FIG. 8, an illustration of a flowchart of a process for managing network security at an airport is depicted in accordance with an advantageous embodiment. The process illustrated in FIG. 8 may be implemented using policy management system 120 in FIG. 1.

The process begins by identifying a threat level for an airport (operation 800). The threat level may be identified as, for example, without limitation, one of threat levels 602 in FIG. 6. In this illustrative example, operation 800 may be performed by, for example, policy manager 124 in FIG. 1.

Thereafter, the process identifies a group of policies for a network data processing system at the airport based on the threat level identified for the airport (operation 802). Operation 802 may also be performed by policy manager 124 in FIG. 1. The group of policies is identified from a number of policies, such as policies 122, generated by, for example, policy specifier 123 in FIG. 1. The network data processing system may be, for example, network data processing system 106 in FIG. 1. Of course, the group of policies may also be identified for a network data processing system for an aircraft when the aircraft is at or near the airport.

Next, the process initiates enforcement of the group of policies in the network data processing system at the airport (operation 804), with the process terminating thereafter. In performing operation 804, policy manager 124 sends group of policies 135 to number of agents 126 in network data processing system 106 in FIG. 1. In some illustrative examples, policy manager 124 sends instructions for enforcing group of policies 135 in FIG. 1. Upon receiving group of policies 135 and/or instructions, number of agents 126 enforces group of policies 135 in network data processing system 106 at airport 102 in FIG. 1.

Figure 9:
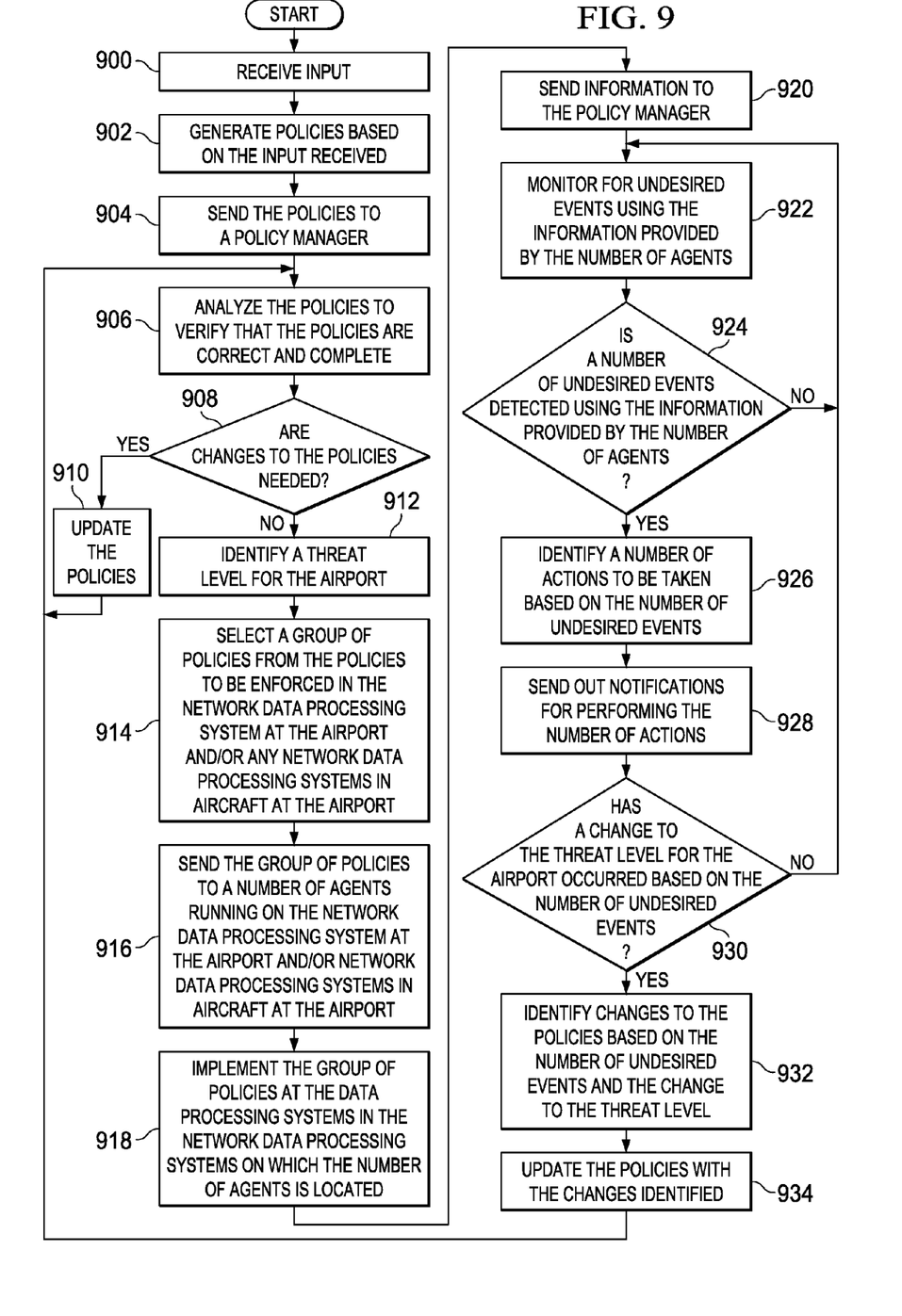
FIG. 9 is an illustration of a flowchart of a process for managing network security at an airport in accordance with an advantageous embodiment.

With reference now to FIG. 9, an illustration of a flowchart of a process for managing network security at an airport is depicted in accordance with an advantageous embodiment. The process illustrated in FIG. 9 is a more-detailed process of the steps described in FIG. 8. This process may be implemented using policy management system 120 in FIG. 1. In particular, this process may be implemented using policy specifier 123, policy manager 124, and number of agents 126 in policy management system 120 in FIG. 1.

The process begins by policy specifier 123 receiving input (operation 900). The input includes any number of rules, regulations, criteria, guidelines, recommendations, and/or other suitable information that may be used to manage security at an airport and/or the aircraft at the airport. In particular, the security is for a network data processing system at the airport and/or any network data processing systems in e-enabled aircraft at the airport. In operation 900, the input may be, for example, input 128 in FIG. 1 and FIG. 2.

Next, policy specifier 123 generates policies 122 based on input 128 received (operation 902). The policies generated may include, for example, without limitation, any number of the policies described in policies 122 in FIG. 1 and/or other types of policies.

Thereafter, policy specifier 123 sends policies 122 to policy manager 124 (operation 904). In this illustrative example, policy manager 124 processes policies 122 using policy analyzer 132, policy decision maker 134, policy enforcer 136, and policy updater 138 in FIG. 1.

Policy analyzer 132 analyzes policies 122 to verify that policies 122 are correct and complete (operation 906). Policy manager 124 then determines whether changes to the policies are needed (operation 908). If changes to the policies are needed, policy updater 138 updates the policies (operation 910), with the process then returning to operation 906 as described above.

Otherwise, if changes to policies 122 are not needed, policy decision maker 134 identifies threat level 129 for airport 102 (operation 912). Policy decision maker 134 selects a group of policies from policies 122 to be enforced in network data processing system 106 at airport 102 and/or any network data processing systems in aircraft 104 at airport 102 (operation 914).

Policy enforcer 136 sends the group of policies to number of agents 126 running on network data processing system 106 at airport 102 and/or network data processing systems in aircraft 104 at airport 102 (operation 916). Number of agents 126 implements the group of policies at the data processing systems in the network data processing systems on which number of agents 126 is located (operation 918).

Number of agents 126 sends information to policy manager 124 (operation 920). In this illustrative example, operation 920 may be performed continuously or periodically, depending on the implementation.

In this illustrative example, the information provided by the number of agents in operation 920 may include network configuration settings, information about the status of the data processing systems on which the number of agents is located, and/or other suitable information. This information may be used to detect whether undesired events have occurred or are occurring in the network data processing system at the airport and/or network data processing systems on the aircraft at the airport.

Policy enforcer 136 monitors for undesired events using the information provided by number of agents 126 (operation 922). Policy enforcer 136 determines whether a number of undesired events is detected using the information provided by number of agents 126 (operation 924). If a number of undesired events is not detected, the process returns to operation 922 as described above.

Otherwise, if a number of undesired events is detected, policy decision maker 134 identifies a number of actions to be taken based on the number of undesired events (operation 926). The number of actions may be actions to be performed by programs running on the network data processing system at the airport and/or the network data processing systems on the aircraft at the airport and/or human operators.

Policy enforcer 136 sends out notifications for performing the number of actions (operation 928). These notifications may be sent to number of agents 126 and/or other data processing systems for display to human operators who can perform the number of actions. For example, the notifications may include information or instructions for the number of actions to be performed, alerts indicating the number of actions to be performed, and/or other suitable information.

Further, policy decision maker 134 determines whether a change to the threat level for the airport has occurred based on the number of undesired events (operation 930). If a change to the threat level has occurred, policy analyzer 132 identifies changes to policies 122 based on number of undesired events 140 and the change to threat level 129 (operation 932). Thereafter, policy updater 138 updates policies 122 with the changes identified (operation 934).

Next, the process returns to operation 906 as described above with policy analyzer 132 validating the consistency and completeness of the updated policies. In this manner, policy decision maker 134 uses the updated and validated policies to select the group of policies for enforcement in operation 914.

With reference again to operation 930, if a change to the threat level has not occurred, the process returns to operation 922 as described above.

In some illustrative examples, additional input may be received during one or more of the steps in the process described in FIG. 9. This additional input may be, for example, user input requesting that the process described in FIG. 9 be stopped and restarted using new input that may be included with the request. The new input may then be used to generate new policies in operation 902 that replace the previously generated policies. Of course, in other illustrative examples, other types of input may be received during the process.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages, as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an e-enabled aircraft including an aircraft data processing system;
    a network data processing system configured for use at an airport, the network data processing system in communication with the aircraft data processing system;
    a policy manager comprising a processor, the policy manager configured to manage a number of policies based on a threat level for the airport, the policy manager further configured to identify a number of undesired events for the network data processing system and the aircraft data processing system and identify a number of actions to be performed in response to the number of undesired events, the number of undesired events including undesired events in categories selected from the group consisting of safety events, security events, business events, and operational events, and the policy manager further configured to adjust the threat level based on identifying a number of undesired events from more than one category of events;
    a policy specifier configured to receive input, to identify information for use in identifying the threat level for the airport, and to generate the number of policies for the data processing system and the aircraft data processing system; and
    a number of agents configured to run on the network data processing system and configured to implement the number of policies on the network data processing system and the aircraft data processing system.

2. The apparatus of claim 1, wherein an agent in the number of agents is configured to enforce the number of policies on a data processing system in the network data processing system on which the agent is located and to enforce the number of policies on the aircraft data processing system.

3. The apparatus of claim 1, wherein the policy manager is configured to identify the threat level for the airport.

4. The apparatus of claim 3, wherein the policy manager is configured to select a group of policies for enforcement in the network data processing system in response to identifying the threat level for the airport and initiate the enforcement of the group of policies.

5. The apparatus of claim 4, wherein in being configured to initiate the enforcement of the group of policies, the policy manager is configured to send the group of policies to at least a portion of the number of agents.

6. The apparatus of claim 4, wherein the threat level includes at least one of a cyber-security threat level and a physical threat level.

7. The apparatus of claim 1, wherein the policy manager is further configured to identify a change to the threat level for the airport and update the number of policies in response to identifying the threat level for the airport.

8. The apparatus of claim 1, wherein in being configured to implement the number of policies on the network data processing system, the number of agents is configured to manage communications with the aircraft data processing system including specifying a type of communications link in response to a changed threat level.

9. The apparatus of claim 8, wherein in being configured to manage the communications with the aircraft data processing system, the number of agents is configured to specify at least one of a particular data processing system in the network data processing system used to communicate with the computer on the aircraft, a wireless access point, and a time during which the communications between the particular data processing system and the data processing system on the aircraft is permitted.

10. The apparatus of claim 1, wherein the network data processing system comprises:
    a network; and
    a plurality of data processing systems connected to the network.

11. The apparatus of claim 1, wherein the number of policies comprises at least one of a security policy, a safety policy, a business policy, an airport policy, an aircraft access policy, a communications policy, a computer access policy, a physical access policy, and a network access policy.

12. An aircraft communications system comprising:
    an e-enabled aircraft including a number of aircraft data processing systems;
    a network data processing system at an airport, the network data processing system in communication with the number of aircraft data processing systems;
    a policy manager comprising a processor configured to manage a number of policies for communicating with the network data processing system at the airport and the number of data processing systems on the aircraft at the airport, the policy manager further configured to identify a number of undesired events for the network data processing system and the number of aircraft data processing systems and identify a number of actions to be performed in response to the number of undesired events, the number of undesired events including undesired events in each category of safety events, security events, business events, and operational events, and the policy manager further configured to adjust the threat level based on identifying a number of undesired events from more than one category of events;
    a policy specifier configured to receive input, to identify information for use in identifying the threat level for the airport, and to generate the number of policies for the data processing system and the number of aircraft data processing systems; and a number of agents configured to run on the network data processing system and configured to implement the number of policies for communicating with the network data processing system and the number of aircraft data processing systems.

13. The aircraft communications system of claim 12, wherein the number of agents is configured to implement a policy in the number of policies specifying a communications link for use in communicating with the number of aircraft data processing systems.

14. The aircraft communications system of claim 13, wherein the communications link is selected from one of a wired communications link, an optical communications link, a wireless communications link, and the wireless communications link using a selected access point.

15. The aircraft communications system of claim 12, wherein the number of policies comprises at least one of a security policy, a safety policy, a business policy, an airport policy, an aircraft access policy, a communications policy, a computer and access policy, a physical access policy, and a network access policy.

16. The aircraft communications system of claim 12, wherein the number of aircraft data processing systems on the aircraft is a number of electronic devices selected from at least one of a computer, a mobile phone, a tablet computer, a router, a laptop computer, and a wireless interface.

17. A method for managing network security at an airport, the method comprising:

monitoring for a number of undesired events in a network data processing system and an aircraft data processing system in an e-enabled aircraft and identifying a number of actions to be performed in response to the number of undesired events, monitoring including monitoring the number of undesired events in each category of safety events, security events, business events, and operational events, the monitoring performed by a policy manager in a processor;

responsive to identifying a threat level for the airport, identifying a number of policies for a network data processing system at the airport and the aircraft data processing system based on the threat level identified for the airport, the identifying a number of policies performed by the policy manager;

adjusting the threat level based on identifying the number of undesired events from more than one category of events;

initiating enforcement of the number of policies in the network data processing system and the aircraft data processing system including sending the number of policies to an agent in the network data processing system; and enforcing, by the agent in the network data processing system, the number of policies on a data processing system in the network data processing system on which the agent is located.

18. The method of claim 17, wherein the initiating step is performed by a policy manager.

19. The method of claim 17, wherein initiating an enforcement of the number policies in the aircraft data processing system comprises downloading a new database for the aircraft data processing system in response to a changed threat level.

20. The method of claim 17 further comprising:

responsive to a changed threat level, communicating with an agent in the aircraft data processing system to manage a communications link with the aircraft so as to specify a type of communications link.

21. The method of claim 20, wherein communicating with an agent in the aircraft data process system further comprises communicating a wireless access point and a time during which communication between the network data processing system and the aircraft data processing system is permitted.

* * * * *